(12) United States Patent  
Grauberger et al.

(10) Patent No.: US 9,037,287 B1  
(45) Date of Patent: May 19, 2015

(54) SYSTEM AND METHOD FOR OPTIMIZING A MAIL DOCUMENT SORTING MACHINE

(71) Applicants: Thomas F. Grauberger, Venus, TX (US); Jeremy S. McWilliam, Arlington, TX (US); Thomas Glassman, Colleyville, TX (US); James Anton Curgus, Plano, TX (US); Vladimir A. Popov, Arlington, TX (US); Yi C. Kim, The Colony, TX (US); Michelle Elizabeth Cantrell, Arlington, TX (US); John E. Horn, Aubrey, TX (US); David F. Gibbs, Euless, TX (US); Lance Glover Snead, Carrollton, TX (US); Brent A. Daboub, Fort Worth, TX (US)

(72) Inventors: Thomas F. Grauberger, Venus, TX (US); Jeremy S. McWilliam, Arlington, TX (US); Thomas Glassman, Colleyville, TX (US); James Anton Curgus, Plano, TX (US); Vladimir A. Popov, Arlington, TX (US); Yi C. Kim, The Colony, TX (US); Michelle Elizabeth Cantrell, Arlington, TX (US); John E. Horn, Aubrey, TX (US); David F. Gibbs, Euless, TX (US); Lance Glover Snead, Carrollton, TX (US); Brent A. Daboub, Fort Worth, TX (US); Hoang M. Nguyen, Flower Mound, TX (US)

(73) Assignee: National Presort, Inc., Fort Worth, TX (US)

( * ) Notice: Subject to any disclaimer, the term of this patent is extended or adjusted under 35 U.S.C. 154(b) by 145 days.

(21) Appl. No.: 13/769,950

(22) Filed: Feb. 19, 2013

Related U.S. Application Data

(60) Provisional application No. 61/600,228, filed on Feb. 17, 2012.

(51) Int. Cl.  
*G06F 7/00* (2006.01)  
*G06F 17/00* (2006.01)

(52) U.S. Cl.  
CPC .................................... *G06F 17/00* (2013.01)

(58) Field of Classification Search  
USPC ......................................................... 700/224  
See application file for complete search history.

(56) References Cited

U.S. PATENT DOCUMENTS

| | | | |
|---|---|---|---|
| 7,979,155 B2 * | 7/2011 | Moran et al. | 700/223 |
| 2009/0000996 A1 * | 1/2009 | Stemmle | 209/584 |
| 2013/0124255 A1 * | 5/2013 | Patterson et al. | 705/7.27 |

* cited by examiner

*Primary Examiner* — Gene Crawford  
*Assistant Examiner* — Kyle Logan  
(74) *Attorney, Agent, or Firm* — James E. Walton; Damon R. Hickman (57) ABSTRACT

A system and method for optimizing mail sorting equipment based upon various commingled data files and user selected options includes a sorter, an optimizing system, and a computer for optimizing the sort plan based upon the data files and user settings.

6 Claims, 4 Drawing Sheets

SYSTEM AND METHOD FOR OPTIMIZING A MAIL DOCUMENT SORTING MACHINE

This application claims the benefit of U.S. Provisional Patent Application No. 61/600,228 filed 17 Feb. 2012, titled "SYSTEM AND METHOD FOR OPTIMZING A MAIL DOCUMENT SORTING MACHINE," which is hereby incorporated by reference for all purposes as if fully set forth herein.

BACKGROUND

1. Field of the Invention

The present invention relates in general to the field of mail sorters.

2. Description of Related Art

Private mailers use Barcode Reading (BCR) sorting machines to read pre-barcoded mailpieces and sort them according to a user generated sort plan. Alternatively, private mailers use Multi-Line Optical Character Reading (MLOCR) sorting machines to read mailpiece address blocks, perform USPS Zone Improvement Plan (ZIP+4®) Directory Lookup, spray and verify the lookup result as a barcode, and sort the mail according to a user generated sort plan. For performing this service, private mailers receive postage discounts based upon qualified mail ZIP Code separations and mail volume. Since the number of ZIP Code destinations in the postal system far exceeds the number of separations possible on a sorting machine or across the limited number of sorting machine operated by a private mailer, the efficiency of the user generated sort plan has a large impact on the labor and material costs required to process a mailing and on the postal discount achieved. Using the user generated sort plan, the sorters finalize mail to as many direct ZIP Code destinations as practical in a single pass, while a portion of the bins receive mail to multiple ZIP Codes that must be separated by reprocessing on subsequent passes to achieve the desired level of postal discount.

With each mailing submittal to the Post Office, private mailers generate mailing data that accurately records the mail ZIP Code separations, mail volumes, and postal discounts achieved. One may manually analyze the performance of previous mailings for specific days, weeks, or date ranges of interest in order to improve the quality of the user generated sort plans based upon past mail processing performance. However, manual analysis of past mail processing performance is very subjective, is very time consuming, and potentially offers a very limited number of benefits.

Figure 1:
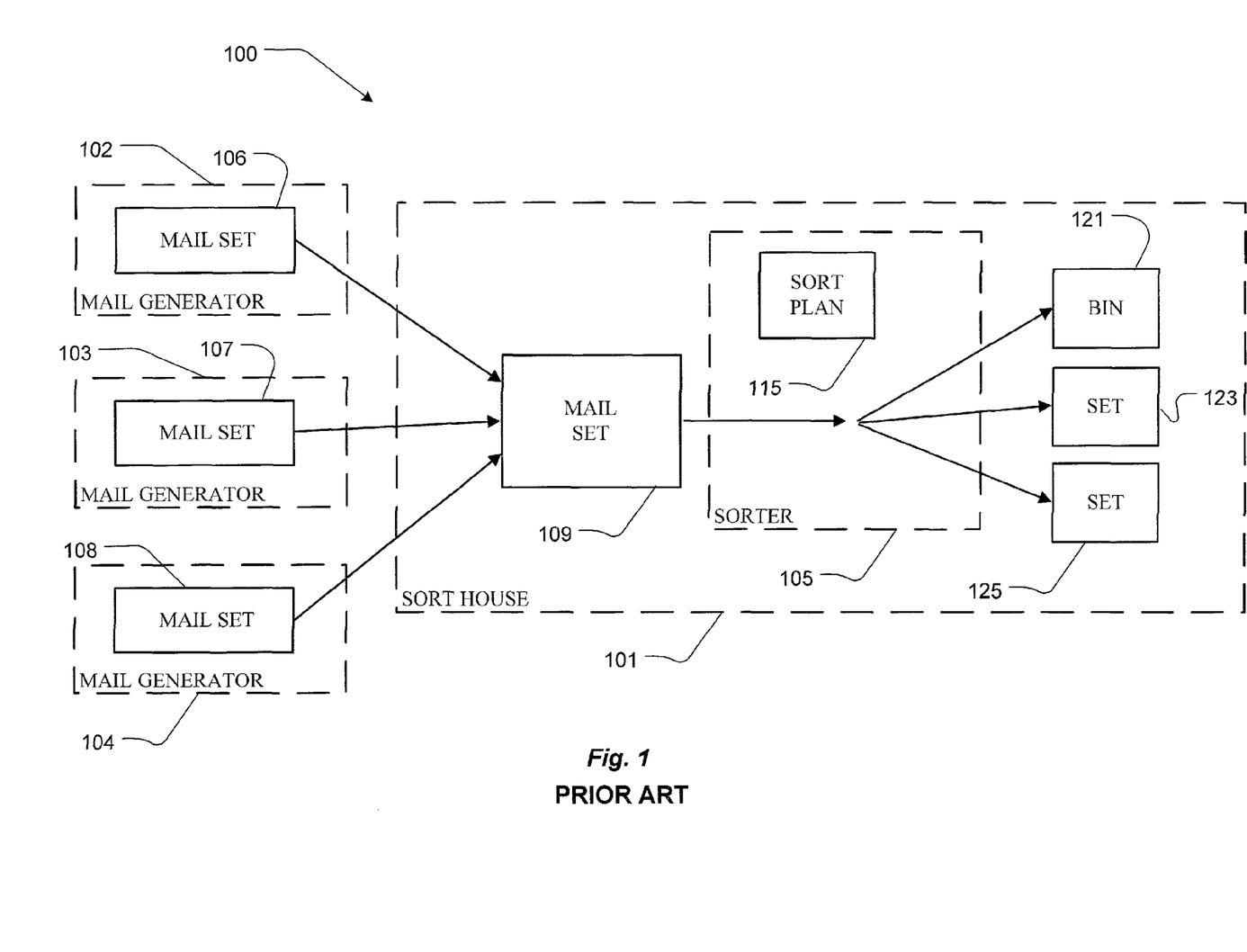
FIG. 1 is a schematic of a conventional mail sorting system.

Referring to FIG. 1 in the drawings, a schematic of a conventional planed sorter is illustrated. A typical system 100 to sort mail includes a sort house 101 and various mail generators 102, 103, 104. A sort house 101 is a facility that takes raw mail in to sort into various groupings based upon things such as zip codes and type of mailings. Sort house 101 can provide mail generators, such as mail generator 102, mail generator 103, and mail generator 104, discounts to combine mail streams and sort mail by zip codes. For example, mail generator 102 could be a retailer with a set of catalogs 106. Mail generator 103 could be a credit card company sending credit card statements 107. Mail generator 104 could be a print shop mailing out coupons 108. Typically, sort house 101 includes a sorter 105 and a mail set 109. Mail set 109 is typically comprised of various mail sets 106, 107 and 108 from different mail generators 102, 103, and 108. The sorter 105 processes the mail set 109 based upon the instructions provided in the sort plan 115. Sort plan 115 is generated by a user and typically designates the sorter 105 to sort the mail set 109 based upon widely used zip codes. Sort plan 115 does not change to reflect the composition of the mail set 115. For example sort plan 115 tells the sorter 105 to group certain mailings into certain bins based upon zip codes. There are a limited number of bins, such as bin 121, bin 123, and bin 125 in the sorter 105, sorted mail than does not end up in a bin will be grouped together in a separate holding bin. The more inefficient the sort plan 115, the more likely mail will end up in the holding bin. If the amount of mail in the holding bin is too great the mail in the holding bin will be passed through the sorter 105 in a second pass to further sort the mail. Second passes wastes time and resources.

Although great strides have been made in the area of mail processing, considerable shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method for optimizing a mail document sorting machine are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The features and processes of the present application overcome common disadvantages associated with the manual generation of Pass 1 sort plans and the manual analysis of mail processing results for administrative improvements. The present application features a user-friendly interface that greatly simplifies the collection, import, editing, and commingling of historic mailing data that when processed and analyzed, generates an optimized Pass 1 sort plan and generates reports that facilitate administrative improvements. A more efficient Pass 1 sort plan further minimizes the amount of mail to be handled in Pass 2, which thereby reduces the associated labor costs.

The system and method of the present application automates the process and more, providing the following benefits. The user may select, load, customize, and commingle historical data in variety of formats. The user may project and generate future sort schemes based upon historical performance. The user may increase Pass 1 mail qualifications to reduce postage costs. The user may reduce labor and material costs by minimizing Pass 2. The user may achieve heighten visibility of operator performance through trend analysis. The user may achieve heighten visibility of customer performance through trend analysis. The user may include unplanned mail with planned data. The user may report on included or excluded mail along with modifying the user's postal paperwork. The user may use special tools that automatically configure sorters, thereby reducing operator error and expediting processing. The user may use special tools that automatically load customer account data, thereby reducing operator error and expediting processing.

The system and method of the present application may be implemented by utilizing one or more suitable components including; OpteSort™; OpteMerge™; OpteStart™; OpteTrack™; OpteEdit™; OptePost™; and OpteTrend™. OpteSort™ is a business optimization software suite. OpteMerge™ provides the ability to commingle a variety of files and edit within those files to maximize profitability. OptePlan™ generates pre-scheme from history with greater accuracy. OpteStart™ allows customer and machine requirements to be converted to easy to use bar codes. OpteTrack™ allows a sort to stay on time with real time monitoring to ensure the user make its CET. OpteEdit™ configures spoilage options and edit Mail.dat data. OptePost™ allows uploading of actual mail files to the Postal One system. OpteTrend™ generates reporting either detailed on customer costs, or down to the machine profitability.

The system and method of the present application provides edited levels of commingling by which diverse, historic mailing results data existing in various file formats can be imported and edited, then commingled according to user defined selections. The commingled result can produce various Pre-Processing Reports that predict minimized cost per piece, provide trend analysis, and generate optimized, initial sort plans that maximize the efficiency of product processed on sorting machines based upon these predicted volumes. Additionally, the system and method of the present application provides tools to uniquely estimate time to complete the mailing based upon sorting machine capabilities, predict machine-loading and man-loading required per machine, and calculate labor requirements based upon these predicted volumes. Furthermore, the system and method of the present application provides tools to uniquely add unplanned mail to the mailing and generate Inclusion Reports and compare planned processing with actual processed results in order to generate exclusion/waste reports. Also the system and method of the present application provides tools to uniquely monitor mail processing in near real-time and, if necessary, alert the user to stop and alter the initial sort plan should actual mail processing performance fall short of predicted performance.

The system and method of the present application facilitates loading of pre-commingled datafiles, such as Mail.dat files, having known USPS Zone Improvement Plan (ZIP+4®) Code destinations that are then processed against a preloaded United States Postal Service (USPS®) Customer/Supplier Agreement (CSA) (or an equivalent postal requirement) in order to build skids to be routed to specific postal facilities. The system and method generates a sort plan for the sorters that establishes the physical relationship of mail pieces in trays to bins on the sorters, and establishes the physical relationship of these bins on the sorters to skids according to the derived routing. This sort plan is also applied to the letter production equipment so that as the mail pieces are generated, they are placed in trays in skid order.

The system and method of the present application facilitates commingling of pre-production STD mail streams having known USPS ZIP+4® Code destinations and quantities that when processed through a 3rd party logistics software re-orders the mail streams into ranges of ZIP Codes by consolidator destination, sets a flag for skid breaks, and generates skid tags. The 3rd party logistics software result is applied to the letter production equipment that generates the mail pieces according to the plan. The mail is trayed and labeled, and the trays are separated according to the skid breaks and routed to the appropriate sorter. The 3rd party logistics software result is also applied to the system and method, which generates corresponding sort plans and tray tags for the sorters that establishes the physical relationship of mail pieces in trays to bins on the sorters, and establishes the physical relationship of these bins on the sorters to skids according to the consolidator routing.

The system and method of the present application facilitates user selection of Input mailing data for specific days, weeks, or date ranges of interest for all currently recognized mailing data storage formats. The import result is called a job master file.

The optimizer optionally facilitates the customization of imported data according to mail class and type, and allows the user to optionally correct account or customer naming anomalies and/or delete accounts and customers within the job master. After commingling, the user may select reports that show the combined results of the previous mailings. Most importantly, the optimizer optimizes the previous mailing data to show how a more efficient sort plan would have resulted in reduced labor and material costs and greater postal discounts. After evaluating the reports, the user may again edit the data import to repeat the process described above or the user may generate the optimized sort plan. The system and method of the present application features a high-speed sort plan generator that uniquely facilitates important time management tools. Entries are provided for total bins available, estimated sorter throughput, and number of operators required with labor burden rates. The optimizer calculates an estimated time to complete the mailing.

The system and method of the present application provides tools to automate preloading of United States Postal Service (USPS®) Customer/Supplier Agreement (CSA) routing data for First Class Mail and/or USPS Facility Access & Shipment Tracking (FAST®) drop data for Standard Class Mail.

The system and method of the present application provides a sort plan designation for the containers and trays records. Users will use this sort plan designation to identify and print a mail piece's target sort plan via the tray to piece relationship as defined by the Mail.dat specification.

The system and method of the present application optionally features a job/run barcode generator that facilitates creation of a bar coded job card and bar coded run cards for the mailing. When the sorter operator scans the job card using a barcode reader at the sorter, the sorter is automatically configured and the sort plan for the mailing is loaded. For each mail stream staged for processing, when the sorter operator scans the associated run card, the sorter is automatically configured for that mail account or customer.

The system and method of the present application allows the user to review and edit spoilage information. Based on configured changes, the optimizer will re-qualify inherent data, update the Mail.dat file and generate associated reports.

The system and method of the present application validates all mailpiece service type identifiers. The system and method reports invalid STID, or Service Type Identifier mailpieces and allows the user to select how to reconcile each mailpiece (e.g. delete, change STID).

The system and method of the present application checks for and identifies any duplicate IMBs, or integral mail barcode, within a configured history (i.e. 45 days). The optimizer reports duplicate barcodes and allows the user to select how to reconcile each mailpiece (e.g. delete, change automation service level).

The system and method of the present application provides tools to remove data or move mail from the Mail.dat file so it can be processed and included with another day's mailing. For example, a sort shop may be unable to finish a sort job before the deadline to send mail out, therefore it can move mail from one day to the next via the optimizer's reconfiguring the sort plan.

The system and method of the present application provides tools to include data or bypass mail within a Mail.dat file that was not processed on the sorter.

The system and method of the present application optionally provides trending reports whereby users can recognize both positive and negative trends. By analyzing these trends, managers can potentially identify factors that result in positive trends and apply them to transform negative trends thereby improving future performance.

The system and method of the present application optionally features a job/run barcode generator that facilitates creation of a bar coded job card and bar coded run cards for the mailing. When the sorter operator scans the job card using a barcode reader at the sorter, the sorter is automatically configured and the sort plan for the mailing is loaded. For each mail stream staged for processing, when the sorter operator scans the associated Run card, the sorter is automatically configured for that mail account or customer.

The system and method of the present application optionally facilitates the reading of custom barcodes that contain data such as mail piece weight, mail piece identification (ID), or other customer defined data. In addition, the application of USPS mobile barcodes or commercially available Quick Response (QR) codes direct mail piece recipients to designated websites.

The system and method of the present application optionally features a tray/skid tracking algorithm that when selected, establishes a physical relationship of mail pieces to trays and of trays to skids and generates the required number of skid flags. Additional options facilitate loading of United States Postal Service (USPS®) Customer/Supplier Agreement (CSA) routing data and/or USPS Facility Access & Shipment Tracking (FAST®) drop data.

The Post Processing Reports function of the system and method of the present application provides a final comparison of Planned Performance versus Actual performance and features special tools to simplify the handling of missing mail. For critical mail streams, or those streams where each piece of mail must be accounted for, missing mail pieces are optionally identified, removed from the mailing, and flagged for reproduction. For non-critical mail streams, missing mail pieces are optionally acknowledged and paid for. Exclusion and/or Waste Reports can be viewed or exported. The optimizer facilitates the analysis of any unplanned mail streams that were added to the mailing that were not part of the original plan to determine the impact on the overall mailing.

The system and method of the present application facilitates generation of customer mail performance reports and facilitates uploads in compliance with the requirements of the USPS Business Customer Gateway and PostalOne!

Figure 2:
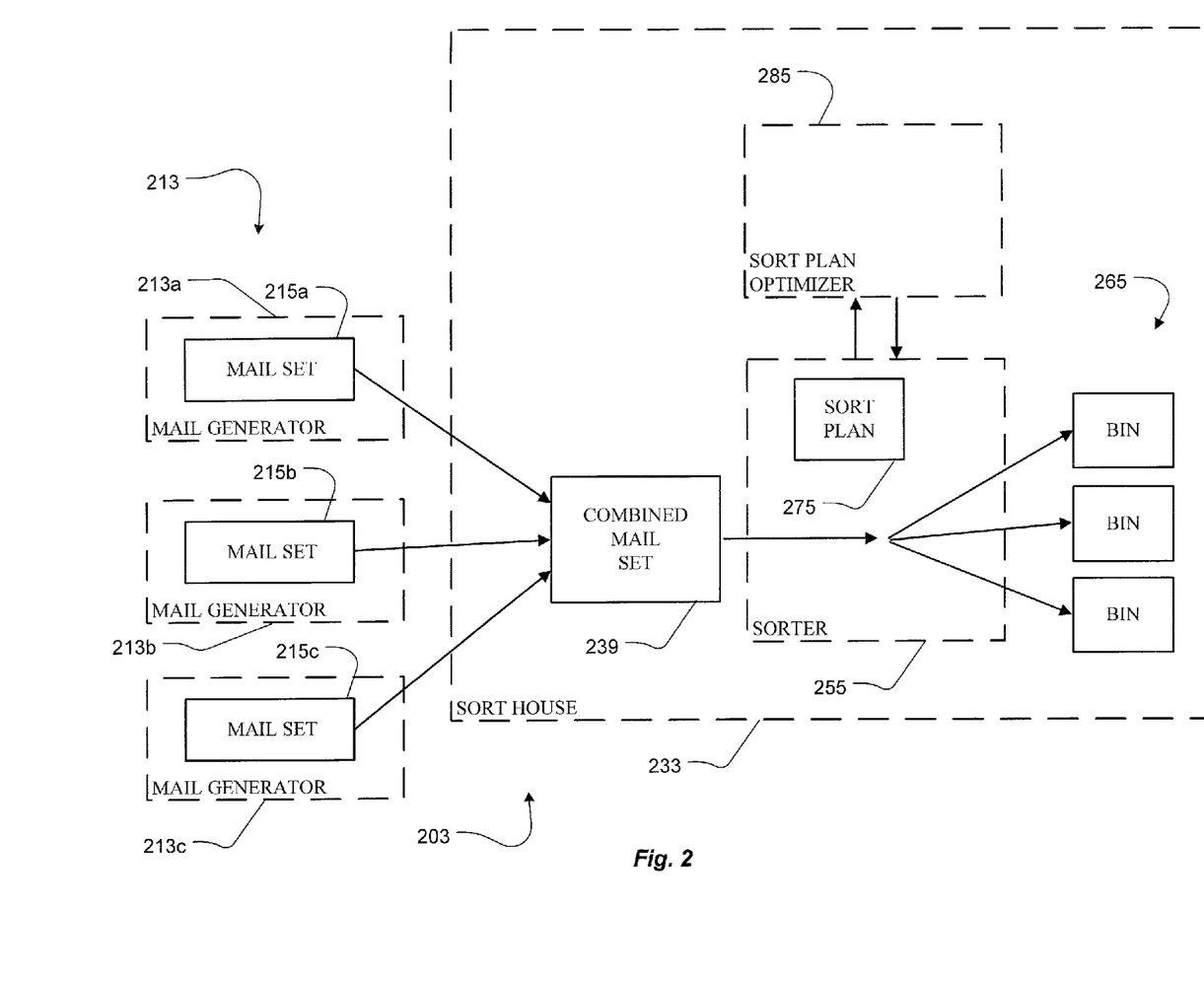
FIG. 2 is a schematic of a system for optimizing a mail document sorting machine according to the present application.

Referring to FIG. 2 in the drawings, a schematic of a system for optimizing a mail document sorting machine according to the present application is illustrated. System 203 is comprised of mail generators 213 and a sorting house 233. Mail generators 213 is comprised of mail generator 213a, mail generator 213b, and mail generator 213c. For example, mail generator 213a could be a retailer with a set of catalogs 215a. Mail generator 213b could be a credit card company sending credit card statements 215b. Mail generator 213c could be a print shop mailing out coupons 215c. Mail generators 213 send their mail sets 213 to a sort house 233 to realize cost savings by combining mail sets. The post office provides discounts for postal users that have larger volumes of sorted mail. Combined mail set 239 is comprised of mail sets 215a, 215b, and 215c. Combined mail set 239 has been shown with three mail sets however it should be apparent that more or less mail sets are capable of being combined together to form a combined mail set 239.

Combined mail set 239 is processed by the sorter 255. Processing by the sorter 255 includes sorting the combined mail set 239 into various bins 265. The sorter 255 determines which article of mail is sorted by the sorter 255 based upon the sort plan 275. The sort plan 275 is comprised of a list of various data identifies, such as zip codes, classes or categories of mail. The sorter 255 reads the address of the mail piece via optical reader or barcode reader and then based on the sort plan 275 diverts the mail piece to a specific bin in the group of bins 265. If the mail article has a zip code not designated in the sort plan then the mail piece ends up collected with similar assorted pieces in a redo or pass 2 bin.

Sort plan optimizer 285 provides the sorter with an optimized sort plan based upon various datasets and user enabled options. Sort plan optimizer 285 allows a user to input data files into the sort plan optimizer 285. Sort plan optimizer 285 allows a user to filter data, edit job, commingle various datasets, generate pre-processing analysis, and then generate a optimized sort plan. Additionally, the sort plan optimizer 285 can provide near-real time feedback to the user comparing the pre-processing analysis with the actual results of the sort, produce post-processing reports, upload data to the post office, and help generate barcodes.

Figure 3:
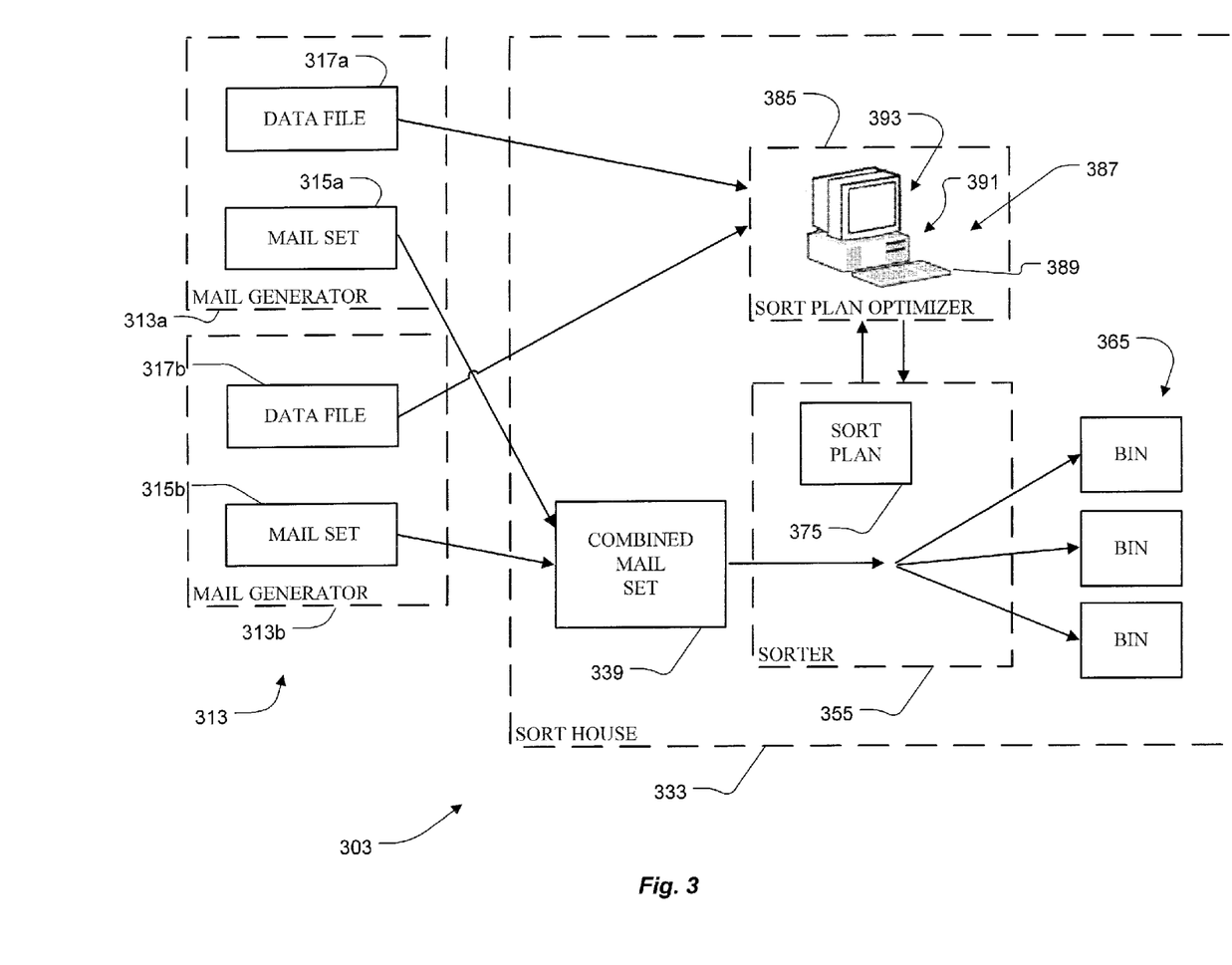
FIG. 3 is a schematic of a preferred embodiment of a system for optimizing a mail document sorting machine according to the present application.

Referring now also to FIG. 3 in the drawings, a schematic of a preferred embodiment of a system for optimizing a mail document sorting machine according to the present application is illustrated. System 303 is comprised of mail generators 313 and a sorting house 333. Mail generators 313 are comprised of mail generator 313a and mail generator 313b. For example, mail generator 313a could be a retailer with a set of catalogs 315a. Mail generator 313b could be a credit card company sending credit card statements 315b. In this embodiment the mail generators have some datafiles related to their mail sets. The mail sets could be sorted before leaving the mail generators 313 thereby creating a dataset 317a. Alternatively, the mail generators 313 have a database used to formulate the mailing labels thereby resulting in a dataset 317b. Mail generators 313 send their mail sets and datasets to a sort house 333 to realize cost savings by combining mail sets. The post office provides discounts for postal users that have larger volumes of sorted mail. Combined mail set 339 is comprised of mail sets 315a and 315b. Combined mail set 339 has been shown with two mail sets however it should be apparent that more mail sets are capable of being combined together to form a combined mail set 339.

Combined mail set 339 is processed by the sorter 355. Processing by the sorter 355 includes sorting the combined mail set 339 into various bins 365. The sorter 355 determines which article of mail is sorted by the sorter 355 based upon the sort plan 375. The sort plan 375 is comprised of a list of various data identifies, such as zip codes, classes or categories of mail. The sorter 355 reads the address of the mail piece via optical reader or barcode reader and then based on the sort plan 375 diverts the mail piece to a specific bin in the group of bins 365. If the mail article has a zip code not designated in the sort plan then the mail piece ends up collected with similar assorted pieces in a redo or pass 2 bin.

Sort plan optimizer 385 provides the sorter with an optimized sort plan based upon various datasets and user enabled options. Typically, the sort plan optimizer 385 includes a computer 387, a first input device 389, a second input device 391, a computer-readable storage medium, and a display 393. Computer 387 is preferably a desktop computer however any processor capable of running the software associated with the sort plan optimizer. Preferably the first input device 389 is a keyboard. However, it should be apparent that the first input device 389 could be a mouse, joystick, touchpad, keypad. First input device 389 is what enables the user to make various configuration changes and inputs into the sort plan optimizer 385. Second input device 391 in the preferred embodiment is a universal serial bus drive configured for connection to the computer capable of storing and transferring the datasets used by the sort plan optimizer 385. Alternatively, the second input device 391 is a network port for a computer to computer transfer of datafiles or a floppy disk drive. Second input device 391 is also capable of transferring data to the sorter such as the sort plan 375. Alternatively computer 387 includes a first network device capable of transferring data to the sorter 355 such as the sort plan 375 or receiving from the sorter 355 the results of the sort such as time spent, time remaining, etc..... It should be apparent that the sort plan optimizer 385 could be comprised of multiple second input devices such that data can be entering and leaving the sort plan optimizer concurrently. In the preferred embodiment the sort plan optimizer 385 includes a computer-readable storage medium for the storage of the datafiles, the configuration files, and or the sort plan 375. The computer-readable storage medium could be stored locally on the computer 387 or remotely on a different computer located away from computer 387. Furthermore, the computer-readable storage medium could be cloud based such that multiple computers and sort plan optimizers could interface and concurrently store their data. Display 393 is preferably a computer monitor capable of displaying the interface screens related to sort plan optimizer 385. In an alternative embodiment, display 385 is a touch-screen capable of acting as a second input device when the user touches the display.

Sort plan optimizer 385 allows a user to input data files into the sort plan optimizer 385. Sort plan optimizer 385 allows a user to import data, filter data, edit job, commingle various datasets, generate pre-processing analysis, and then generate a optimized sort plan. Additionally, the sort plan optimizer 385 can provide near-real time feedback to the user comparing the pre-processing analysis with the actual results of the sort, produce post-processing reports, uploaded data to the post office, and help generate barcodes.

Figure 4:
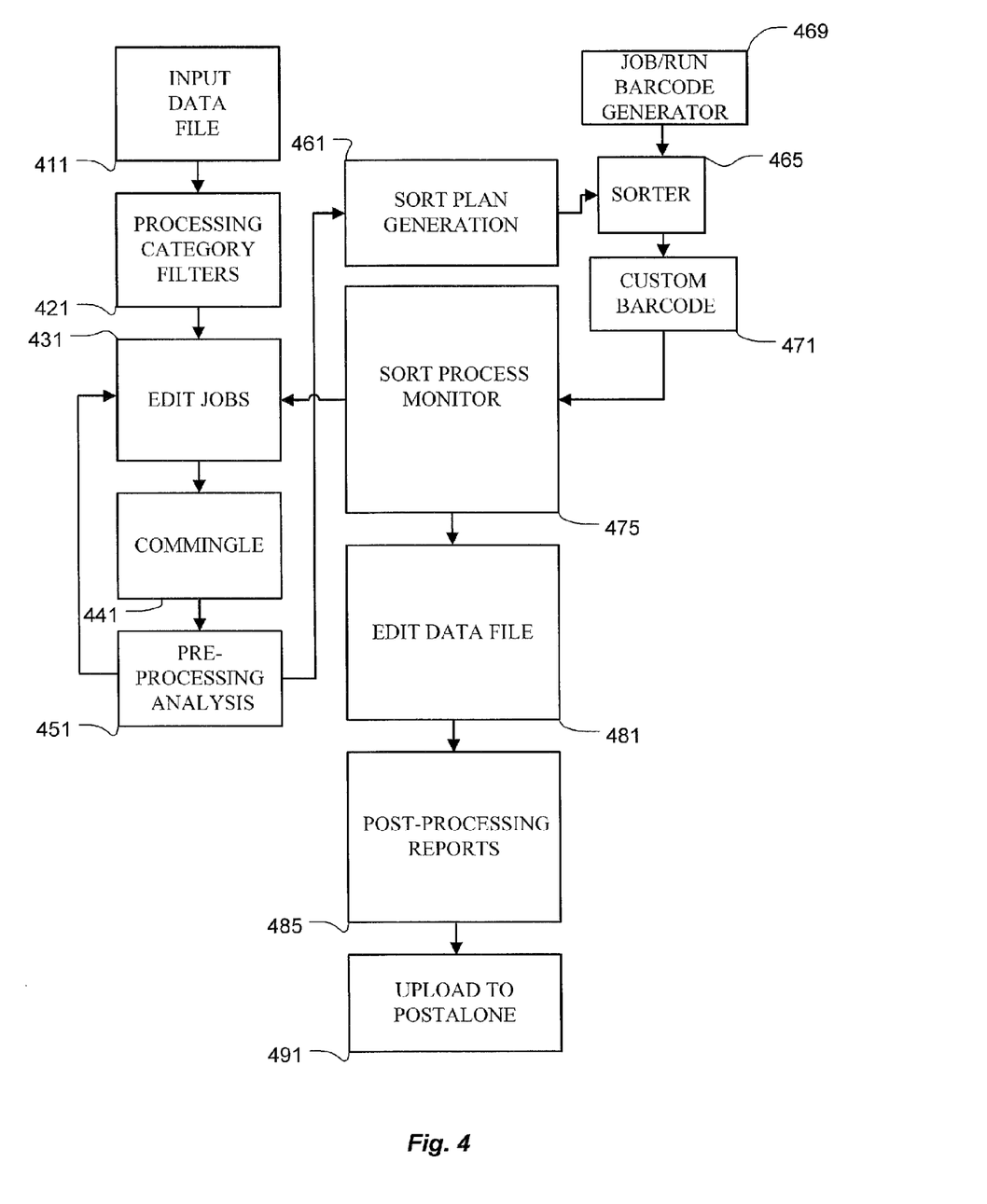
FIG. 4 is a flowchart of a preferred embodiment of a method for optimizing a mail document sorting machine according to the present application.

Referring now also to FIG. 4 in the drawings, a flowchart of a preferred embodiment of a method for optimizing a mail document sorting machine according to the present application is illustrated. The method of optimizing a mail document sorting begins with importing or inputting a data file 411, the user is then able to filter 421 the data, the user edits the jobs 431, data is then commingled 441, the user can have some pre-processing analysis completed 451, after the pre-processing analysis 451 the user can either repeat the edit 431 or have the sort plan generated 461. The sort plan is then transferred to the sorter 465. Optional barcodes 469 can be added and provide encoded information easily read 471 by machines. Sort process monitoring 475 is available to the user based upon the sort. During the sort if the progress of the sort doesn't match pre-processing analysis the sort can be terminated and the edit job 431 task can be redone. The ending datafile can be edited 481 based upon the actual sort. The user is able to generate and review post-processing reports 485. Results then are posted 491 to other systems such as postal-one.

Input data files 411 facilitates import of historic mail processing data in all industry standard formats. Historically, Private Mailers have been required to archive mail processing data for 1 year. Regardless of format imported into the optimizer, this archived mail processing data has the potential when analyzed to greatly increase postal discounts realized because the resulting, efficient Pass 1 sort plan achieves a greater depth of sort and minimizes the amount of mail to be handled in Pass 2, which thereby reduces the associated labor costs. The unique ability of the optimizer to import historic mail processing data in all formats is important because Private Mailers may have collected mail processing data in different ways and even in different formats over time. For example, mailing data for USPS Postal Numeric Encoding Technique (POSTNET®) mailings may have been collected in a text-based or spreadsheet-based format. When that customer transitions to USPS Intelligent Mail®, mailing data will be collected in a database format. Import formats include, but are not limited to the following: historic Mail.dat files; historic Mail.xml files; historic compressed data files; historic Text Files that use a defined character delimiter to separate tabular values; and historic proprietary Sort.bin and Sort.ver text files. Mail.dat files, which are data files that meet the communication specification defined by the International Digital Enterprise Alliance (IDEAlliance). The USPS receives and accepts Mail.dat files as valid electronic representations of mailing data for the purposes of physical mail acceptance and postage payment. Mail.xml files, which are data files that meet the communication specification defined by the IDEAlliance. The USPS receives and accepts Mail.xml files as valid electronic representations of mailing data for the purposes of physical mail acceptance and postage payment. Historic compressed data files, which are data files that have been processed by a compression algorithm or other means to reduce the data file size without loss of the original data. For example, a zip file is one of many file formats used for data compression and archiving. Historic data files produced by computer spreadsheet applications that contain data in rows and columns and are saved in applicable data formats. Historic Text Files that use a defined character delimiter to separate tabular values. These text file types use a text delimiter character such as a comma, a tab character, a pipe symbol, or another character or characters to delimit data values in the file. Examples include comma-separated values (CSV) and tab-separated values (TSV) text files. The optimizer can automatically generate account names for ZIP Code List or ZIP Code List with Quantity data imports that do not have an actual Job name. The system and method of the present application can import historic NPI proprietary Sort.bin and Sort.ver text files. These files were used to generate documentation for mailing submittals to the USPS prior to the mailing industry transition to database data collection methods required to comply with the USPS Intelligent Mail® initiative.

After data import 411, the system and method of the present application facilitates selection of specific Processing Categories or filtering of data 421 within the import. Since a primary objective of the method is the generation of more efficient sort plans based upon user selected data imports, user-friendly options to edit the data import uniquely allow the user to focus more specifically on Processing Categories in the data import, which includes, but is not limited to the following: first-class mail; standard mail; periodical mail; package services mail; non-profit mail; automation mail; and machinable mail. First-Class Mail, is mail which meets postal requirements for size, weight, and material and contains bills, invoices, personal correspondence, and merchandise. Standard Mail is mail, which meets postal requirements for size, weight, and material and contains advertisements, circulars, newsletters, small parcels, and merchandise. Periodical Mail is mail, which includes newsletters and magazines. Package Services Mail is mail, which includes Parcel Post, Bound-Printed Matter, Media Mail, and Library Mail. Non-Profit Mail is mail, which is mail eligible for reduced postage rates when the mail owner meets the USPS definition of a non-profit entity. Automation Mail is mail, which is mail that is 100% barcoded, prepared, and presorted for further processing on USPS high-speed mail processing equipment. Machinable Mail is mail, which is any mail that can be processed through the USPS automated mail processing system.

After processing category filters, 421, the system and method of the present application facilitates Filtering of Jobs and Customers. Since a primary objective of the application is the generation of more efficient sort plans based upon user selected Data Imports and Processing Categories, user-friendly options to filter the result uniquely allows the user to focus more specifically on aspects of the data import, which includes, but is not limited to the following: Include/Exclude Job; Include/Exclude Customer; Generate Job Master; edit naming anomalies; and auto generates account names. Include/Exclude Job—Mail.dat/Mail.xml: The optimizer empowers the user to delete jobs or include jobs from the previously selected mail processing data import. Jobs may be filtered for specific days, weeks, or date ranges of interest. Include/Exclude Customer—Mail.dat/Mail.xml: The optimizer empowers the user to delete customers or include customers from the previously selected mail processing data import. For example, if mail for a specific Customer was processed in the Data Import, but is not included in the new mailing, that Customer can be edited from the Data Import so that after Commingling, the optimized sort plan and associated labor costs reflects the reduced mail volume. Generate Job Master: The optimizer empowers the user to create a Job Master from the edited result. For other input formats, since the optimizer imports historic mailing data from different sources, the naming conventions used for various fields within the files may differ slightly. The user can edit naming anomalies for these fields, ensuring proper consolidation of data during the Commingle Process. For other input formats, the optimizer also auto generates account names and/or dates.

After editing jobs 431, the system and method of the present application facilitates the Commingle Process 441, whereby the imported, edited data is merged according to user selected commingle-method options, which include the following: Job/Account; Job/Customer; Job Master/Account; and Job Master/Customer. Commingling takes multiple data input files and combines them to form a single combined data file. This commingling enables data processing of a single data set to occur when multiple groups of mail are combined to reduce postage. Having a single dataset enables statistical analysis of the data. If the data sets were not comingled then various statistical analysis of various datasets would have to be made and then combined resulting in additional processing time and cost. The commingle method by which a single Job data input file is processed by Account is Job/Account. A Job is all of the mail runs for a specific mailing submittal. A mail run, or Account, is data collected for specific mail types, including class, weight, and postage type characteristics. The commingle method by which a single Job data input file is processed by Customer is Job/Customer. A Customer is Account data collected for a specific mail owner. The commingle method by which multiple Job data input files are combined and sorted by Job Master and then sub-grouped by Account is Job Master/Account. The commingle method by which multiple Job data input files are combined and sorted by Job Master and then sub-grouped by Customer is Job Master/Customer. When the Job Master edits 431 are complete, the optimizer further allows the user to optionally select how the results are commingled.

After the commingle process 441, the system and method of the present application facilitates the Pre-Processing Reports Process 451, whereby reports are generated for analysis based on the commingled data set and the selected commingle-method. All report information can be exported for the purpose of trend analysis. The reports include the following: Summary Report; Detailed Report; and Averaging Report. A Summary Report is a comprehensive, single-level, total mailing report based on the commingled data set and the selected-commingle method. A Detailed Report is a comprehensive, two-level, total mailing report with account and/or customer breakouts based on the commingled data set and the selected-commingle method. An averaging Report is a Summary and Detailed report that reflect averaged totals for selected days, weeks, or date ranges of interest. Reports reflect average past performance and can be used to predict average future performance.

Note that the Summary Report and Detailed Report both compare historic mailing results data with the optimized mailing results data generated by the optimizer, which most importantly and uniquely shows the user the revenue lost due to the inefficiency of historic sort plans. The Detailed Report additionally shows the user the mailing performance for the selected accounts and/or customers. Information reported includes the following: Total Pieces; Realized Postage; Optimized Postage; SAPostage; Full Service Discount; Lost Potential; Max Potential; Net Postage; and/or Value Added. Total Pieces are the sum of all mail pieces analyzed within the commingled data set based on the selected commingle-method. Realized Postage is the total postage paid for the commingled data set based on the selected commingle-method. Optimized Postage reflects the total postage due if the commingled data set had been sorted to its deepest level. SAPostage reflects the total postage due if each job had been processed separately. Full Service Discount is the percentage discount the USPS gives mailers who process mail pieces at the full-service level. Lost Potential is the realized Postage minus the Optimized Postage. Max Potential is the Stand Alone Postage minus the Optimized Postage. Net Postage is the Realized Postage minus the Full Service Discount. Value Added, which is for metered mailpieces only, reflects the mail rate times Total (Metered) Pieces minus Realized Postage. It identifies if the mailer owes money to or is due money back from the USPS. After evaluating the reports, the user may again edit the import data 431 import to repeat the processing described above or the user may generate the Optimized Sort Plan 461.

The optimizer uniquely provides important time management tools, which include optional entry of total number of bins available, average sorter throughput, number of operators required with labor burden rates, which are used to estimate the total time and the labor costs required to complete the mailing.

An optional feature is a time/cost saving Job/Run Barcode Generator Process 469, which facilitates creation of a barcoded Job card and barcoded Run cards for the mailing. When the sorter operator scans the Job card using a barcode reader at the sorter, the sorter 465 is automatically configured and the sort plan for the mailing is loaded. For each mail stream staged for processing, when the sorter operator scans the associated Run card, the sorter is automatically configured for that mail account or customer. Aside from simplifying the configurations, the optimizer help avoid costly errors and/or reprocessing of mail when Job and/or Run entry errors are made. Additionally, optional reading of Custom Barcodes that contain data such as mail piece weight, mail piece identification, or other customer defined data. In addition, application of USPS mobile barcodes or commercially available Quick Response (QR) codes direct mail piece recipients to designated Websites.

Sort Process Monitor 475 allows users to monitor important processing performance data comparing Projected Processing with Actual Processing results in near-real time. The optimizer uniquely notifies the user when near-real time monitoring of the Actual Time to complete the mailing exceeds the Projected Time to complete the mailing. When notified, the user can stop the current mail run, re-submit the remainder of the mailing through the optimizer to produce a new sort plan that when applied, allows the remainder of the mail to be processed within the remaining submittal window. In addition, the optimizer allows the inclusion of additional, unplanned mail streams. The Near Real-Time Monitoring function of the system and method of the present application displays important processing performance data comparing Projected Performance with Actual Performance. Data monitored may include time to complete, total labor/hour cost, run hours/cost, and shift run/hours cost. A unique feature of the system and method of the present application notifies the user when the monitored actual time to complete the mailing exceeds the projected time to complete the mailing. When notified, the user may stop the current mail run and re-submit the remainder of the mailing through the application or optimizer to produce a new sort plan that when applied, allows the remainder of the mail to be processed in a shorter amount of time. In addition, the system and method of the present application permits inclusion of additional unplanned mail streams.

When selected, the Tray/Skid Tracking Algorithm option uniquely establishes a physical relationship of mail pieces to trays and of trays to skids and generates the required number of skid flags. Additional options facilitate loading of United States Postal Service (USPS®) Customer/Supplier Agreement (CSA) routing data and/or USPS Facility Access & Shipment Tracking (FAST®) drop data.

The Edit function 481 of the system and method of the present application provides a means to validating and editing Mail.dat data. Once the mail is processed on the Sorter, the Edit Mail.dat function validates STIDs, evaluates barcode uniqueness, and calculates spoilage. Based on results, the user can make informed decisions on how to handle invalid mail.

Post Processing Reports function 485 of the system and method of the present application provides a final comparison of Planned Performance versus Actual Performance and uniquely features special tools to simplify the handling of Missing Mail. For critical mail streams, missing mail pieces are optionally identified, removed from the mailing, and flagged for reproduction. For non-critical mail streams, missing mail pieces are optionally acknowledged and paid for. Exclusion and/or Waste Reports can be viewed or exported. The system and method of the present application facilitates the analysis of any unplanned mail streams that were added to the mailing that were not part of the original plan to determine the impact on the overall mailing.

The system and method of the present application optionally provides trending reports whereby users can recognize both positive and negative trends. By analyzing these trends, managers can potentially identify factors that result in positive trends and apply them to transform negative trends thereby improving future performance. Managers can evaluate performance by sorter to determine crew efficiency. Managers can evaluate performance by customer to determine mail stream efficiency and provide cost comparisons and feedback to the customers that can improve the performance of the mailings.

At the completion of mail processing, the system and method of the present application facilitates the optional generation of customer mail performance reports and facilitates the mandatory uploads 491 in compliance with the requirements of the USPS Business Customer Gateway and Postal-One!

It is apparent that a system and method with significant advantages has been described and illustrated. The particular embodiments disclosed above are-illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A method of optimizing a mail document sorting machine, comprising:
   inputting a first datafile;
   inputting user settings;
   generating an optimized sort plan based upon a statistical analysis of the user settings and the first datafile;
   sorting mail documents based upon the optimized sort plan
   producing likely results of implementing the optimized sort plan;
   analyzing the likely results of implementing the optimized sort plan;
   producing pre-analysis results based upon the likely results;
   reporting to a user the pre-analysis results;
   analyzing the sorting;
   producing sorting results based upon analyzing the sorting;
   comparing the sorting results to the pre-analysis results; and
   reporting to the user the comparison between the sorting results and the pre-analysis results.

2. The method of optimizing a mail document sorting machine according to claim 1, wherein the reporting to a user the comparison between the sorting results and the pre-analysis results is completed in near real-time for allowing the user to stop the sorting before the completion of sorting.

3. The method of optimizing a mail document sorting machine according to claim 1, wherein the statistical analysis includes trend analysis of predicted zip codes.

4. The method of optimizing a mail document sorting machine according to claim 1, further comprising:
   inputting a second datafile;
   comingling the first datafile with the second datafile; and
   producing a comingled dataset from the comingling of the first dataset with the second dataset;
   wherein the generating an optimized sort plan is based upon the user settings and the comingled dataset.

5. The method of optimizing a mail document sorting machine according to claim 1, wherein the first datafile and the second datafile are historical mail processing records.

6. The method of optimizing a mail document sorting machine according to claim 4, wherein the first datafile is a listing of a first group of mail and the second datafile is a listing of a second group of mail, and wherein the first group of mail and the second group of mail have been combined.

* * * * *